Dec. 10, 1968  R. D. SCHOONOVER  3,416,074
MULTI-UTILITY ELECTRICAL CIRCUIT TESTER INCLUDING A
SOLENOID WITH ARMATURE INDICATING MEANS
Filed Dec. 20, 1966  2 Sheets-Sheet 1
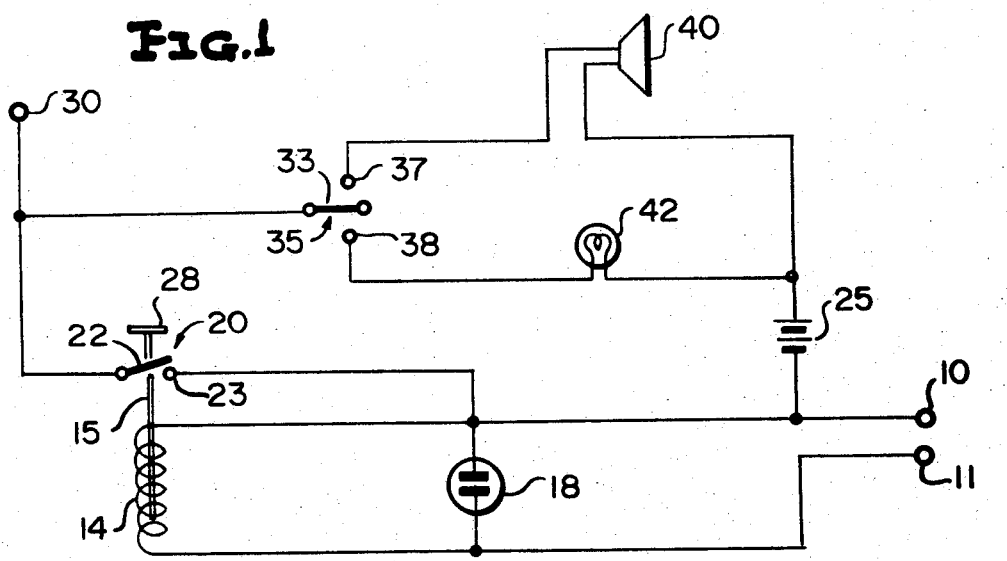
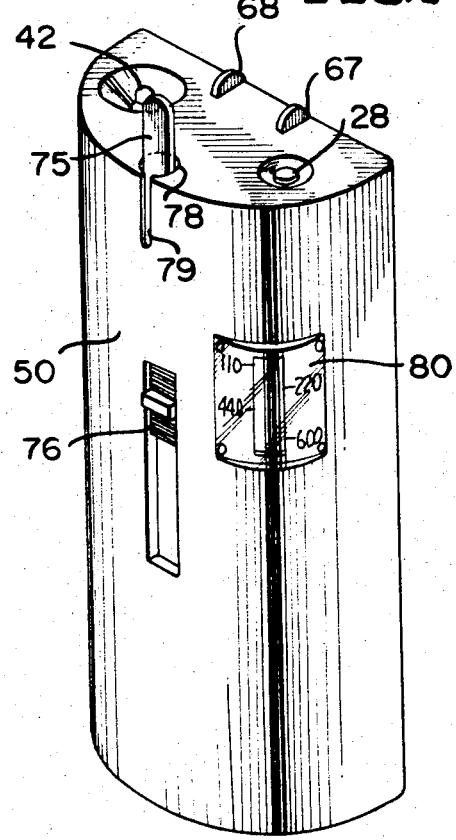
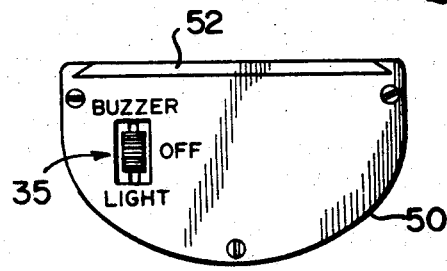
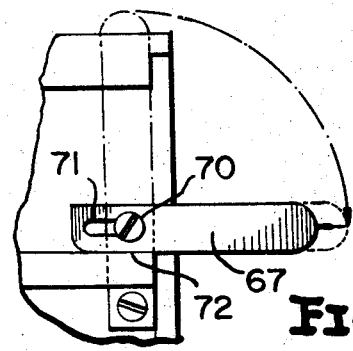
INVENTOR
RUSSELL D. SCHOONOVER
BY *Hurvitz, Rose & Greene*
ATTORNEYS

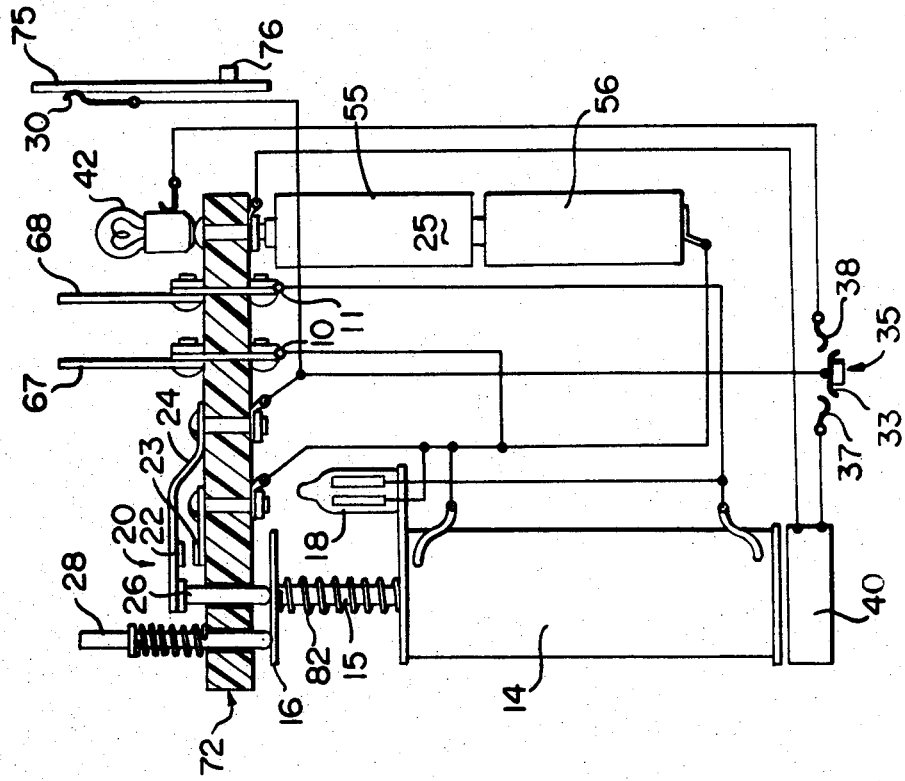
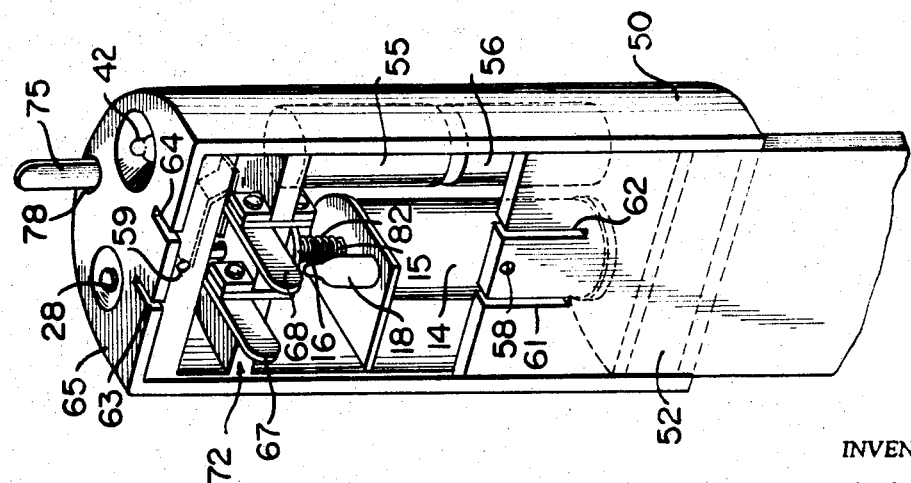
INVENTOR
RUSSELL D. SCHOONOVER

United States Patent Office 3,416,074
Patented Dec. 10, 1968

3,416,074
MULTI-UTILITY ELECTRICAL CIRCUIT TESTER INCLUDING A SOLENOID WITH ARMATURE INDICATING MEANS
Russell D. Schoonover, 2117 SW. 19th Ave., Fort Lauderdale, Fla. 33315
Filed Dec. 20, 1966, Ser. No. 603,192
8 Claims. (Cl. 324—51)

ABSTRACT OF THE DISCLOSURE

An electrical circuit tester comprising a solenoid having: a coil adapted for connection across a voltage to be monitored; and an armature which is displaced as a function of the voltage across said coil. The armature has a pointer secured thereto which translates relative to a scale from which the level of said voltage can be observed. The armature additionally provides closure of a switch when the voltage across said coil exceeds a predetermined level whereby a circuit comprising a battery and an alarm is completed. Switch means are provided for selectively including either a visual or audible alarm in said circuit. Additionally, said armature is manually actuatable to be operative in conjunction with said switch means to maintain said visual alarm energized independent of the voltage across said coil, said visual alarm thereby serving as a light source.

---

The present invention relates generally to electrical measuring and testing instruments and more particularly to multi-utility circuit testers.

There are presently available a number of voltage testers of the general type in which a solenoid actuated armature indicates the magnitude of voltage at an electrical outlet upon insertion of the plug or prongs of the tester into the outlet. Alternatively or additionally the voltage tester is provided with a neon lamp connected across the plug or prongs, the intensity of illumination of the lamp when the tester is plugged in providing to the trained observer a very general indication of the voltage available at the outlet. In any even, such testers are far from accurate, and are not intended to be, serving rather as an economical tool for the electrician or homeowner to supply a qualitative and rough quantitative indication of voltage. Unfortunately, it is often the case that simple testers of the above-mentioned type are purchased but not subsequently used.

The value and utility of such testers is significantly enhanced to the electrician or other potential user, in accordance with the present invention, by inclusion of certain features which render the device suitable for other testing purposes frequently required for electrical power circuits.

For example, it is often the case that the electrician or homeowner finds himself faced with the problem of identifying the fuse or circuit breaker for a particular part of the power supply circuit, in order that power may be cut off to permit safe servicing of that part of the circuit. Not infrequently, the spaces generally provided in or around the fuse box or circuit breaker panel for designation of rooms or equipment supplied (i.e., on a given circuit) are unmarked. If no helper is available, it becomes a matter of removing a fuse, proceeding to the area in which the work is to be performed, testing for the presence of electrical power as by turning on a light, and if power still exists in that area, returning to the power panel and repeating the process until the correct fuse or circuit breaker is identified.

In accordance with a principal aspect of the present invention, the typical earlier mentioned voltage tester is provided with an audible alarm and associated voltage supply and circuit connections to permit the tester to sound an alarm when plugged in or otherwise connected to the "live" power circuit in the area to be serviced. The user may then proceed to the power panel and remove and restore power to the various parts of the house or other facility in the previously described manner until the alarm is silenced, at which point the proper fuse or circuit breaker is identified. It will be noted that this requires only one trip to the power panel, which is usually located in a remote portion of the facility such as the basement or other storage area, in contrast to the probability of several trips back and forth between power panel and area to be serviced before the correct circuit breaker is identified, if attempted in the conventional manner discussed above.

In accordance with another feature of the invention the tester is provided with an exposed lamp and reflector and with associated circuitry to permit its use as a flashlight independently of tester operation as a voltmeter or voltage indicator. Hence, the unit may be used in darkened areas as its own source of light concurrently with any tests which it is employed to perform on wiring, cables, or other electrical conductors in those areas.

Still another feature of the invention resides in the provision in the tester of means by which it may be utilized to check continuity or to test for short-circuit or grounded conditions in conductors. Selection of either the audible alarm or the lamp as the indicator for continuity or associated tests is effected by appropriate setting of a switch on the case of the instrument.

The overall unit is extremely compact and completely portable, and includes a pair of hinged or pivoted connector prongs which may be folded outwardly from the case and locked in position for insertion into a standard electrical socket or folded into the case for storage. Preferably, fused probes are provided and adapted for connection to the prongs so that voltage on leads other than those associated with an outlet may also be checked.

Accordingly, it is a broad object of the present invention to provide an improved compact portable instrument for testing electrical wiring in homes and buildings and for measuring voltage thereon.

It is another object of the invention to provide a multi-utility electric measuring and testing instrument particularly adapted to provide an indication of removal or restoration of power in a circuit at a building location remote from that at which the power removal or restoration is initiated.

A further object of the invention is to provide a circuit tester for electricians, other maintenance people, and homeowners, with which rough voltage measurements and circuit continuity checks may readily be made in darkened or dimly lit areas of a building, and by which connection or disconnection of power at remote areas of the building are announced in response to acts performed at a power control panel for the building.

The above and still further objects, features and attendant advantages of the invention will become apparent from a consideration of the following detailed description of a preferred embodiment thereof, especially when taken in conjunction with the accompanying drawings, in which:

FIGURE 1 is a schematic diagram of an embodiment of a circuit tester in accordance with the present invention;

FIGURE 2 is a perspective view showing the front and top of the tester instrument package;

FIGURE 3 is a bottom view of the tester of FIGURE 2;

FIGURE 4 is a rear view of the tester of FIGURE 2 with rear cover plate partially removed and plug prongs folded outwardly from the case;

FIGURE 5 is a side view of a plug prong, illustrating the manner in which each prong is pivoted; and FIGURE 6 is a developed layout diagram of the tester components and interconnections.

Referring now to the drawings, wherein like reference numerals refer to like components in the several figures, the conventional portion of the tester includes a solenoid coil 14 having its ends connected to a pair of terminals 10, 11 (FIGURE 1) across which a voltage to be measured is applied. Typically, the solenoid 14 is operative over the range from approximately 100 volts to approximately 600 volts A.C. or D.C. In a well known manner, when a voltage within the selected range is applied across the ends of the solenoid coil, an armature 15 disposed axially along the coil moves inwardly thereof by a distance proportional to the magnitude of the applied voltage. The exposed end of armature 15 is provided with an arm or pointer 16 (FIGURE 6) which co-operates with a scale, as will presently be described in detail, to provide an observable measure of voltage. Such an instrument is not intended to be precise, of course, but is sufficiently accurate to supply the user with an approximate reading of the voltage on the supply line measured.

A neon lamp 18 is connected in parallel with solenoid coil 14 and, when energized, glows with an intensity which depends on the magnitude of voltage applied across terminals 10 and 11. The trained observer is often capable of roughly discerning the magnitude of voltage across terminals 10, 11 simply from the intensity of illumination of the neon lamp.

In accordance with the present invention the tester is provided with additional components and circuitry as follows. A switch 20 has an arm 22 connected to a terminal 30 and a stationary contact 23 connected to terminal 10 and to the negative terminal of a low voltage D.C. power source 25. Switch 20 is normally open, and arm 22 thereof is mechanically biased relative to armature 15 of the solenoid to make electrical contact with point 23 when the armature is drawn into the coil in response to voltage across terminals 10 and 11. A spring-loaded plunger 28 is provided as an override element to permit manual actuation of switch 20 without need for application of voltage to terminals 10, 11.

Arm 22 is also connected to movable arm 33 of a three-position switch 35. Stationary contacts 37 and 38 of switch 35 are respectively coupled to the positive terminal of D.C. source 25 via an audible alarm mechanism such as a buzzer or horn 40 and via a visual alarm device such as lamp 42.

By virtue of this structure and cooperative relationship of elements of the tester, the relatively high voltages ordinarily applied across terminals 10 and 11 are isolated from the low voltage portion of the circuit. Rather, the effect of application and removal of high voltages to and from the latter terminals on the low voltage circuit operation is manifested only as a result of movement of armature 15.

On the other hand, lamp 42 of the low voltage circuit may be operated independently of the high voltage portion of the network by switching arm 33 to contact 38 and moving arm 22 against contact 23 whenever it is desired to light the lamp. Hence, lamp 42 may be turned on or off irrespective of voltage measurements being made on the high voltage portion of the circuit, to provide a source of light in a drakened or dimly lit area.

Cooperation between the two circuit portions is achieved when continuity or ground tests on conductors are to be performed. For this purpose, probes are coupled to terminals 10 and 30 and placed in contact with the ends of the wire or other conductor to be checked. Arm 33 of switch 35 is placed in contact point 37 or point 38 depending respectively upon whether an audible or visual indication of continuity is desired. In the event that tests for grounded connections are to be performed, one of the leads connected to terminals 10 and 30 is connected to a point of ground potential and the other to the conductor in question. In both the continuity and ground tests completion of a circuit (i.e., short-circuiting) between terminals 10 and 30 results in an indication from lamp 42 or buzzer 40 depending upon position of switch 35.

For either of the ground or continuity tests switch 20 is left in its open condition; however, lamp 42 may be used to supply light in a darkened area immediately prior to the final placement of probes for these tests by closure of switch 20 (and, of course, contact between arm 33 and point 38 of switch 35). When the connections to be tested are located and probes appropriately clipped or otherwise fastened thereto, the short circuit between terminals 10 and 30 via closed switch 20 must be removed in order to permit an indication on either of elements 40 or 42.

To identify the fuse, circuit breaker, or switch through which power is supplied to a particular room, electrical outlet or piece of equipment, terminals 10 and 11 of the tester are connected to the supply conductors, e.g., via male prongs in the case of an electrical outlet, and switch 35 set for buzzer operation. Assuming that the supply conductors are "hot," i.e., energized, the buzzer will sound and the user may then proceed to the control panel for the building and successively remove power to the various areas until the buzzer or other audible alarm is silenced. At that point the proper fuse, circuit breaker, or switch is identified without assistance from other persons and without need for repeated trips from control panel to the area in which power is to be removed.

An exemplary embodiment of the packaged tester is shown in FIGURES 2–4. The unit includes a semi-cylindrical case 50 within which all components are housed. A slidable rear cover plate 52 is provided to permit ready access to the interior of the unit, such as for replacement of batteries 55, 56 (e.g. standard "C" cells) constituting D.C. power source 25. The cover may be fastened in any convenient manner, as by a screw inserted through cover hole 58 into tapped hole 59 in case 50. The cover is also provided with a pair of slots 61, 62 aligned with slots 63, 64 in the top panel 65 of case 50 to permit folding of pivoted male prongs 67, 68 inwardly and outwardly of the case therethrough. In this manner, the prongs may be neatly folded away when not in use, preferably projecting slightly above the top of the case for convenient access (FIGURE 2), and may be extended when the tester is to be plugged into a standard electrical outlet, or to accommodate test leads or probes.

As shown more clearly in FIGURE 5, each prong 67, 68 is slotted and has a pin or screw shank 70 extending through its respective slot 71. Each prong is supported by a non-conductive ledge 72 and is connected to a respective one of terminals 10, 11. When folded into the case the prongs are disposed such that each pin 70 is located at the bottom of slot 71. When the prong is to be projected perpendicularly to cover plate 52, it is simply pivoted downwardly through an angle of 90-degrees and pushed into the case until pin 70 is located at the end of slot 71 closest the center of the prong. Each prong is then securely maintained in the projecting position by ledge 72.

A slidable conductive tongue 75 is provided in case 50 for contact with terminal 30 (FIGURE 6) when the tongue is pushed outwardly from the case by operation of attached plastic slide 76. With the tongue in its recessed position a hole 78 is provided in top panel 65 for the end of a probe which may be slipped over and into electrical contact with the tongue. Slot 79 may also be provided to accommodate a lead or wire extending from the probe. Tongue 75 has dimensions generally corresponding to those of prongs 67 and 68 to permit use of similar mating probe or test lead connections. The probes (not shown) may be of any conventional type or may be designed especially for the instrument. In some cases it may be desired to provide fused probes to prevent inadvertent application of overloading voltage to the instrument.

Lamp 52 is exposed behind a glass or transparent plastic protector in top panel 65 of case 50 and is surrounded by a standard conical reflector to project a beam when the device is used as a flashlight. Biased on-off switch or button 28 for lamp 42 is recessed in top panel 65.

Switch 35 is a typical sliding switch having three positions designated "buzzer—off—light," for example, and accessible at the bottom panel of case 50 (FIGURE 3).

A transparent window 80 with suitable scale indicia inscribed or printed thereon is mounted in the case adjacent armature 15 and pointer 16 of solenoid 14 to permit observation of the pointer when voltage measurements are being taken. It will be noted that armature 15 is biased by a spring 82 to return to its normal position when the solenoid coil is deenergized. Location of neon lamp 18 adjacent armature 15 enhances lighting of the scale when voltage is applied to prongs 67, 68.

The biasing of contacts 22 and 23 of switch 20 (FIGURE 6) is accomplished with a leaf spring 24 by which contact 22 is urged against contact 23, and spring-loaded armature 15 which provides a counteracting bias against a nonconducting member 26 floating freely in hole 27 of ledge 72 and confronting spring 24.

The specific packaging arrangement of the tester as shown in the drawings is purely illustrative, being a convenient arrangement, and no limitations on the invention are intended thereby.

While I have disclosed a preferred embodiment of my invention, it will be clear that variation of the details of construction which are specifically illustrated and described may be resorted to without departing from the spirit and scope of the invention as defined in the appended claims.

I claim:

1. An electrical circuit tester comprising voltage indicating means for providing an analog indication which varies as a function of the magnitude of voltage applied thereto, means for connecting said voltage indicating means to a source of voltage to be monitored, an audible alarm, an electrical power supply, and means responsive to application of voltage within a predetermined range of magnitudes from said source of voltage to said indicating means for selectively connecting said alarm to said power supply for energization of said alarm wherein said means responsive to application of voltage includes a normally open switch, and means biasing said switch to a closed condition; and wherein said voltage indicating means includes means counteracting the bias on said switch by said biasing means in the absence of application of voltage within said range to said indicating means.

2. The combination according to claim 1 wherein is further included a visual alarm, and switch means for coupling either said audible alarm or said visual alarm for said selective connection and energization.

3. The combination according to claim 2 wherein said visual alarm is a light source and wherein is further included means for maintaining said light source energized independently of the voltage from said source of voltage.

4. The combination according to claim 1 wherein said voltage indicating means includes a solenoid, and an armature disposed for movement along the axis of said solenoid in response to application of voltage thereto, said armature having a normal position in which said counteracting bias is provided.

5. The combination according to claim 4 wherein said visual alarm is a light source; and wherein is further included means for manually overriding the counteracting bias of said armature to energize said light source or said audible alarm according to the coupling provided by said switch means.

6. The combination according to claim 5 wherein said means for connecting the voltage indicating device to the source of voltage includes a pair of conductors; a pair of coil ends for said solenoid connected to said pair of conductors; a terminal coupled to one of said pair of conductors via said switch means, said audible alarm or said light source, according to the coupling provided by said switch means, and said power supply, in the order recited; said alarm or said light source indicating electrical circuit continutiy when a conductive path exists between said one of said conductors and said terminal other than that path existing via said switch means, said alarm or light source, and said power supply.

7. The combination according to claim 6 wherein is included a case for said tester, said case having a panel at which said light source is exposed for use as a flashlight in accordance with the operation of said manual override means.

8. The combination according to claim 7 wherein is included a pair of pivoted male prongs, connected respectively to said pair of conductors, a pair of slots in said case for accepting said prongs when pivoted in one direction and for permitting projection of said prongs from said case when pivoted in a direction opposite said one direction, said prongs having dimensions and spacing appropriate for mating with the dual socket of a standard electrical outlet.

References Cited

UNITED STATES PATENTS

| | | | |
|---|---|---|---|
| 1,433,264 | 10/1922 | Fahlenberg | 324—51 |
| 2,231,660 | 2/1941 | Carlotti et al. | 324—53 |
| 2,632,785 | 3/1953 | Knopp et al. | 324—145 X |
| 2,794,167 | 5/1957 | Jones | 324—53 |
| 3,044,051 | 8/1962 | Block | 340—248 |
| 3,253,215 | 5/1966 | Moakler et al. | 324—51 |
| 3,311,907 | 3/1967 | Teal. | |
| 2,469,703 | 5/1949 | Simkins | 324—51 |
| 3,134,071 | 5/1964 | Wakefield | 324—54 |
| 3,156,863 | 11/1964 | Wakefield | 324—54 |

FOREIGN PATENTS 587,036   4/1947   Great Britain.

RUDOLPH V. ROLINEC, *Primary Examiner.*

G. R. STRECKER, *Assistant Examiner.*

U.S. Cl. X.R.

324—72.5, 133